(12) United States Patent
Park

(10) Patent No.: US 8,902,379 B2
(45) Date of Patent: Dec. 2, 2014

(54) DISPLAY DEVICE AND METHOD FOR MANUFACTURING OPTICAL MEMBER

(75) Inventor: Seung Ryong Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 411 days.

(21) Appl. No.: 13/273,396

(22) Filed: Oct. 14, 2011

(65) Prior Publication Data

US 2012/0113354 A1    May 10, 2012

(30) Foreign Application Priority Data

Nov. 4, 2010 (KR) .................. 10-2010-0109458

(51) Int. Cl.
*G02F 1/1335* (2006.01)
*F21V 8/00* (2006.01)

(52) U.S. Cl.
CPC ............... *G02F 1/133606* (2013.01); *G02F 2001/133614* (2013.01); *G02B 6/0023* (2013.01); *G02F 1/133615* (2013.01); *G02B 6/0025* (2013.01); *G02F 2202/36* (2013.01)
USPC ................. 349/62; 349/63; 349/64; 349/65; 349/66; 349/67

(58) Field of Classification Search
CPC ............ G02F 1/1335; G02F 1/133615; G02F 1/133603; G02F 1/1336; G02B 6/0088
USPC ............ 349/56, 61, 62, 63, 64, 65, 66, 67, 68
See application file for complete search history.

(56) References Cited

U.S. PATENT DOCUMENTS 8,562,198 B2 * 10/2013 Lee ............................... 362/621

FOREIGN PATENT DOCUMENTS

| JP | 2001-052518 A | 2/2001 |
| JP | 2009-231273 A | 10/2009 |
| KR | 10-2009-0060717 A | 6/2009 |

OTHER PUBLICATIONS

Office Action dated Feb. 28, 2012 in Korean Application No. 10-2010-0109458, filed Nov. 4, 2010.

* cited by examiner

*Primary Examiner* — Jennifer Doan
(74) *Attorney, Agent, or Firm* — Saliwanchik, Lloyd & Eisenschenk

(57) ABSTRACT

Disclosed are a display device and a method for manufacturing an optical member. The display device includes a light source; a plurality of wavelength conversion particles to convert a wavelength of a light generated from the light source; and a tube to receive the wavelength conversion particles, wherein a scattering pattern is formed on at least one surface of the tube.

19 Claims, 10 Drawing Sheets

DISPLAY DEVICE AND METHOD FOR MANUFACTURING OPTICAL MEMBER

CROSS-REFERENCE TO RELATED APPLICATION

This application claims the benefit under 35 U.S.C. §119 of Korean Patent Application No. 10-2010-0109458, Nov. 4, 2010, which is hereby incorporated by reference in its entirety.

BACKGROUND

The disclosure relates to a display device and a method for manufacturing an optical member.

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device capable of displaying various images using the white light supplied to the light guide plate through the quantum dot bar as the blue light is emitted from the blue LED has been extensively used.

BRIEF SUMMARY

The embodiment provides a display device capable of improving brightness and brightness uniformity and a method for manufacturing an optical member.

A display device according to the embodiment includes a light source; a plurality of wavelength conversion particles to convert a wavelength of a light generated from the light source; and a tube to receive the wavelength conversion particles, wherein a scattering pattern is formed on at least one surface of the tube.

A display device according to the embodiment includes a light guide plate; a display panel on the light guide plate; a light source at a lateral side of the light guide plate; a tube between the light guide plate and the light source; and a plurality of wavelength conversion particles in the tube, wherein, a scattering pattern is formed on the tube.

A method for manufacturing an optical member includes the steps of forming a scattering pattern on one surface of a tube; and injecting a plurality of wavelength conversion particles into the tube to covert a wavelength of an incident light.

The display device according to the embodiment includes the tube formed on at least one surface thereof with the scattering pattern. In particular, the wavelength conversion particles are accommodated in the tube to convert the wavelength of the light generated from the light source.

The light generated from the light source and/or the light converted by the wavelength conversion particles may be scattered by the scattering pattern formed on the tube.

Therefore, the display device according to the embodiment can display the image by using the uniform light so that the brightness uniformity can be improved. In addition, the display device according to the embodiment can inhibit the brightness non-uniformity, such as the hot spot, and can improve the light efficiency.

Thus, the display device according to the embodiment may have the improved brightness.

DETAILED DESCRIPTION

Figure 1:
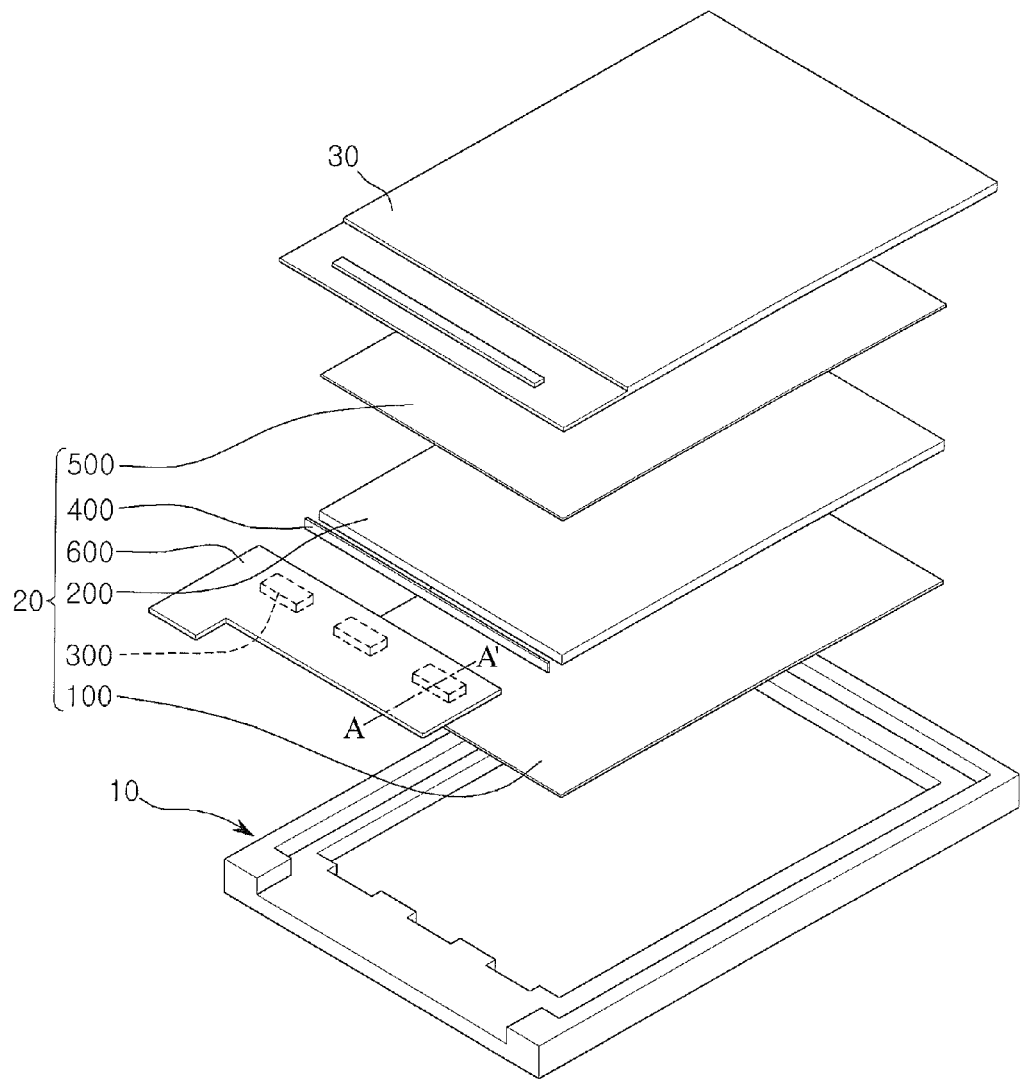
FIG. 1 is an exploded perspective view showing an LCD according to the first embodiment.

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
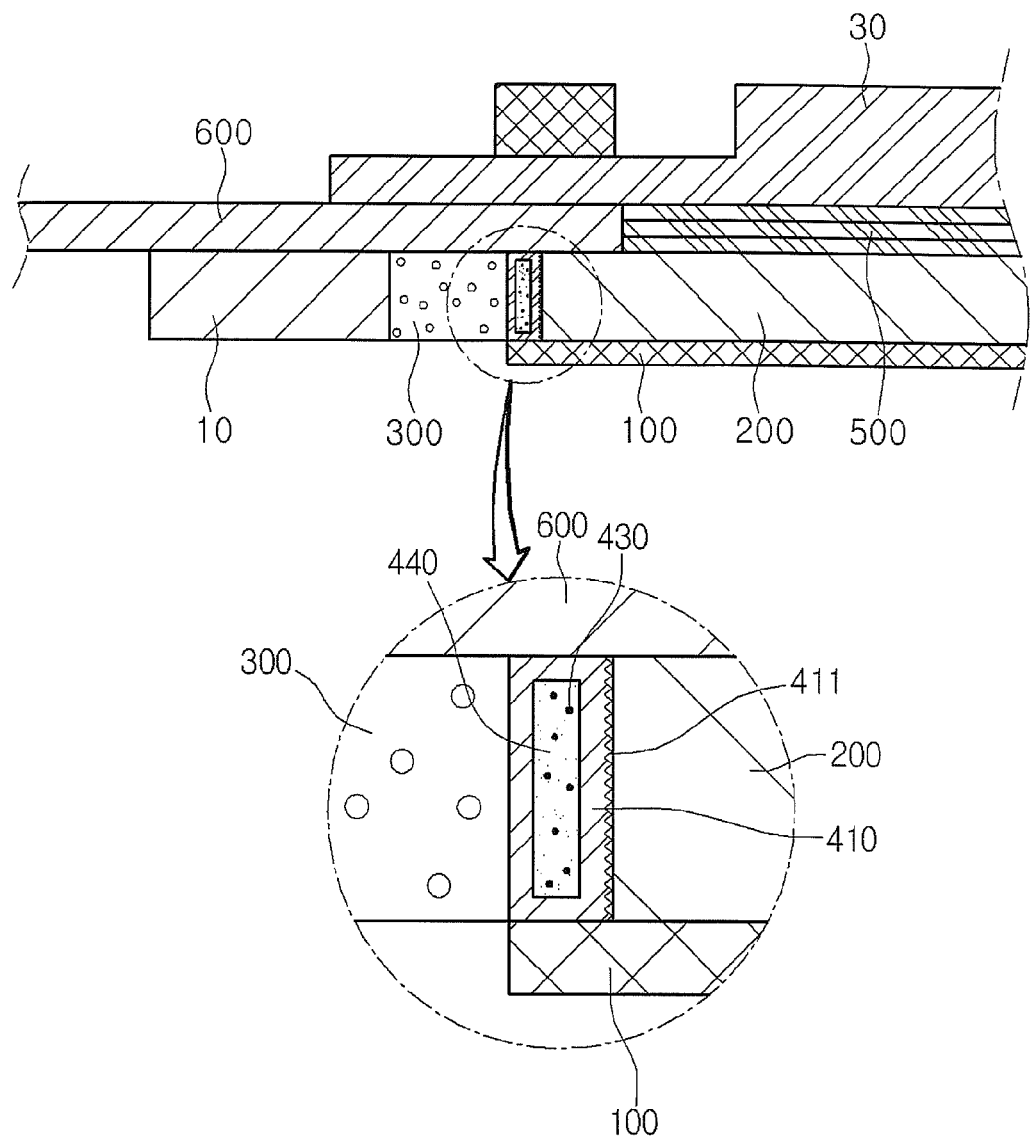
FIG. 2 is a sectional view taken along line A-A' of FIG. 1.
Figure 3:
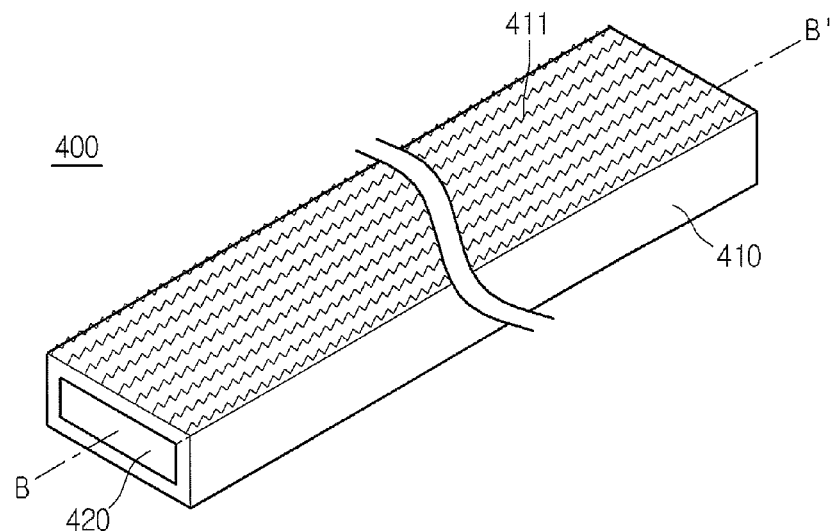
FIG. 3 is a perspective view of a wavelength conversion member according to the first embodiment.
Figure 4:
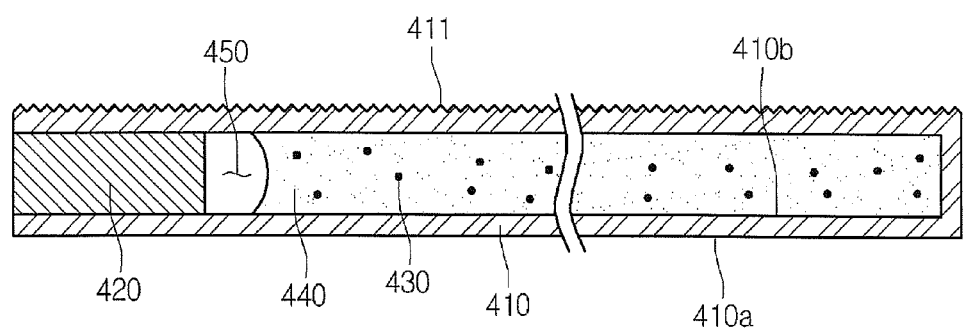
FIG. 4 is a sectional view taken along line B-B' of FIG. 3.

FIG. 1 is an exploded perspective view showing an LCD according to the first embodiment, FIG. 2 is a sectional view taken along line A-A' of FIG. 1, FIG. 3 is a perspective view of a wavelength conversion member according to the first embodiment and FIG. 4 is a sectional view taken along line B-B' of FIG. 3.

Referring to FIGS. 1 to 4, the LCD according to the embodiment includes a mold frame 10, a backlight unit 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10 to generate the light toward the liquid crystal panel 30. The backlight assembly 20 includes a reflective sheet 100, a light guide plate 200, light emitting diodes 300, a wavelength conversion member 400, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100. The light guide plate 200 guides the light upward by totally reflecting, refracting and scattering the light incident thereto from the light emitting diodes 300.

The light guide plate 200 includes an incident surface directed toward the light emitting diodes 300. From among lateral sides of the light guide plate 200, a lateral side directed toward the light emitting diodes 300 may serve as the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the wavelength conversion member 400.

The light emitting diodes 300 may include a blue light emitting diode generating the blue light or a UV light emitting diode generating the UV light. In detail, the light emitting diodes 300 can emit the blue light having the wavelength band of about 430 nm to 470 nm or the UV light having the wavelength band of about 300 nm to 400 nm.

The light emitting diodes 300 are mounted on the FPCB 600. The light emitting diodes 300 can be disposed under the FPCB 600. The light emitting diodes 300 are driven by receiving a driving signal through the FPCB 600.

The wavelength conversion member 400 is interposed between the light emitting diodes 300 and the light guide plate 200. In detail, the wavelength conversion member 400 is bonded to the lateral side of the light guide plate 200. In more detail, the wavelength conversion member 400 is attached to the incident surface of the light guide plate 200. In addition, the wavelength conversion member 400 can be bonded to the light emitting diodes 300.

The wavelength conversion member 400 receives the light from the light emitting diodes 300 to convert the wavelength of the light. For instance, the wavelength conversion member 400 can convert the blue light emitted from the light emitting diodes 300 into the green light and the red light. In detail, the wavelength conversion member 400 converts a part of the blue light into the green light having the wavelength in the range of about 520 nm to about 560 nm, and a part of the blue light into the red light having the wavelength in the range of about 630 nm to about 660 nm.

In addition, the wavelength conversion member 400 can convert the UV light emitted from the light emitting diodes 300 into the blue light, the green light and the red light. In detail, the wavelength conversion member 400 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion member 400 and the lights converted by the wavelength conversion member. In detail, the white light can be incident into the light guide plate 200 through the combination of the blue light, the green light and the red right.

As shown in FIGS. 3 and 4, the wavelength conversion member 400 includes a tube 410, a wavelength conversion part 420, a plurality of wavelength conversion particles 430 and a matrix 440.

The tube 410 receives the wavelength conversion part 420, the wavelength conversion particles 430 and the matrix 440 therein. That is, the tube 410 may serve as a receptacle to receive the wavelength conversion part 420, the wavelength conversion particles 430 and the matrix 440. In addition, the tube 410 extends in one direction.

The tube 410 may have a rectangular shape. In detail, a section of the tube 410, which is vertical to the length direction of the tube 410, may have the rectangular shape. The tube 410 may have a width of about 0.6 mm and a height of about 0.2 mm. The tube 410 may include a capillary tube.

A scattering pattern 411 is formed on at least one surface of the tube 410. In detail, the scattering pattern 411 is formed on at least a part of an outer surface 410a of the tube 410. In more detail, the scattering pattern 411 is formed at least one surface of the tube 410 directed toward the light guide plate. In addition, the scattering pattern 411 may not be formed on an inner surface 410b of the tube 410.

The surface formed with the scattering pattern 411 has a high roughness. In detail, the surface formed with the scattering pattern 411 may have the roughness of about 0.5 μm to about 2 μm. Thus, the surface formed with the scattering pattern 411 may not be transparent, but hazy. Due to the scattering pattern 411, the light having the wavelength converted by the wavelength conversion particles 430 and the light passing through the matrix 440 without being converted may be scattered.

The scattering pattern 411 can be formed through the mechanical scratch process. That is, the scattering pattern 411 can be formed by mechanically scratching the surface to be formed with the scattering pattern 411.

The tube 410 is transparent. The tube 410 may include glass. In detail, the tube 410 may include a glass capillary tube.

The wavelength conversion part 420 is disposed in the tube 410. The wavelength conversion part 420 is arranged at an end of the tube 410 to seal the tube 410. The wavelength conversion part 420 may include epoxy resin.

The wavelength conversion particles 430 are provided in the tube 410. In detail, the wavelength conversion particles 430 are uniformly distributed in the matrix 440 installed in the tube 410.

The wavelength conversion particles 430 convert the wavelength of the light emitted from the light emitting diodes 300. In detail, the light is incident into the wavelength conversion particles 430 from the light emitting diodes 300 and the wavelength conversion particles 430 convert the wavelength of the incident light. For instance, the wavelength conversion particles 430 can convert the blue light emitted from the light emitting diodes 300 into the green light and the red light. That is, a part of the wavelength conversion particles 430 converts the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent.

The matrix 440 surrounds the wavelength conversion particles 430. In detail, the wavelength conversion particles 430 are uniformly distributed in the matrix 440. The matrix 440 includes polymer. The matrix 440 is transparent. That is, the matrix 440 includes transparent polymer.

The matrix 440 is disposed in the tube 410. In detail, the matrix 440 is fully filled in the tube 410. The matrix 440 may adhere to an inner surface of the tube 410.

An air layer 450 is formed between the wavelength conversion part 420 and the matrix 440. The air layer 450 is filled with nitrogen. The air layer 450 performs the damping function between the wavelength conversion part 420 and the matrix 440.

The wavelength conversion member 400 can be formed through the following method.

First, the wavelength conversion particles 430 are uniformly distributed in a resin composition. The resin composition is transparent. The resin composition may have photo-curable property.

Then, internal pressure of the tube 410 formed with the scattering pattern 411 is reduced, an inlet of the tube 410 is immersed in the resin composition in which the wavelength conversion particles 430 are distributed, and external pressure is increased. Thus, the resin composition having the wavelength conversion particles 430 is introduced into the tube 410.

After that, a part of the resin composition introduced into the tube 410 is removed and the inlet of the tube 410 is empty.

Then, epoxy resin composition is introduced into the inlet of the tube 410. The epoxy resin composition is cured so that the wavelength conversion part 420 is formed. The process for forming the wavelength conversion part 420 is performed under the nitrogen atmosphere, so the air layer including nitrogen is formed between the wavelength conversion part 420 and the matrix 440.

The optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrate and polarizing filters.

As described above, the light emitted from the light emitting diodes 300 and/or the light converted by the wavelength conversion particles 430 may be scattered by the scattering pattern 411.

Therefore, the display device according to the embodiment can display images by using uniform light and can improve the brightness. In addition, the display device according to the embodiment can inhibit brightness non-uniformity, such as the hot spot, and can improve the light efficiency.

Thus, the display device according to the embodiment may have the improved brightness.

An adhesive layer is interposed between the tube 410 and the light guide plate 200, so that the tube 410 is bonded to the light guide plate 200 by the adhesive layer. The scattering pattern 411 is formed on the surface of the tube 410 directed toward the light guide plate 200. Thus, the contact area between the tube 410 and the adhesive layer can be enlarged due to the scattering pattern 411.

Therefore, the wavelength conversion member 400 can be securely bonded to the light guide plate 200, so that the LCD according to the embodiment may have enhanced strength.

Figure 5:
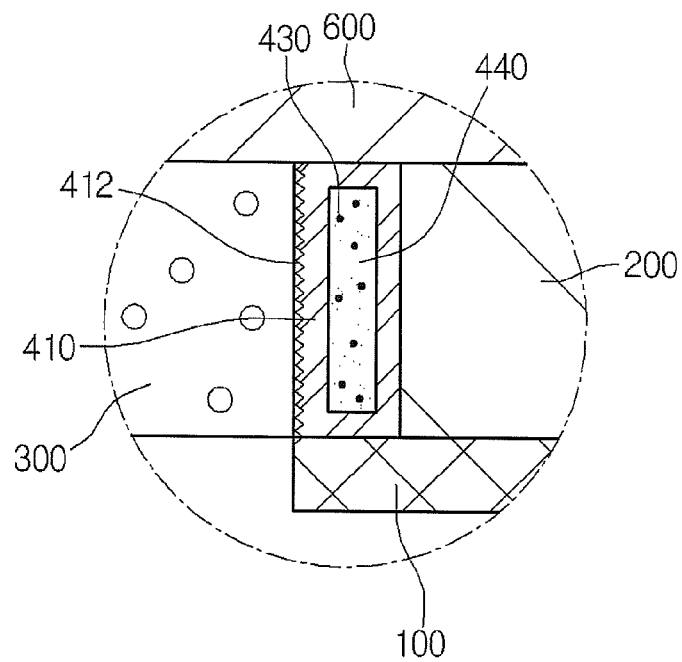
FIG. 5 is a sectional view showing an LCD according to the second embodiment.

FIG. 5 is a sectional view showing an LCD according to the second embodiment. The description of the previous embodiment will be incorporated in the description of the present embodiment by reference and the wavelength conversion member will be further described in the present embodiment. That is, the description about the LCD according to the previous embodiment will be incorporated in the description about the LCD according to the present embodiment.

As shown in FIG. 5, the scattering pattern 412 is formed on the surface of the tube 410 directed toward the light emitting diodes 300. That is, the surface of the tube 410 formed with the scattering pattern 412 faces an exit surface of the light emitting diode 300.

Therefore, the light emitted from the light emitting diodes 300 is scattered by the scattering pattern 412 and then wavelength of the light is converted by the wavelength conversion particles 430.

Since the LCD according to the present embodiment primarily scatters the light emitted from the light emitting diodes 300, the light can be uniformly incident into the wavelength conversion particles 430. Thus, the LCD according to the present embodiment can improve the wavelength conversion efficiency of the wavelength conversion particles 430.

As a result, the LCD according to the present embodiment can improve the brightness and the brightness uniformity.

Figure 6:
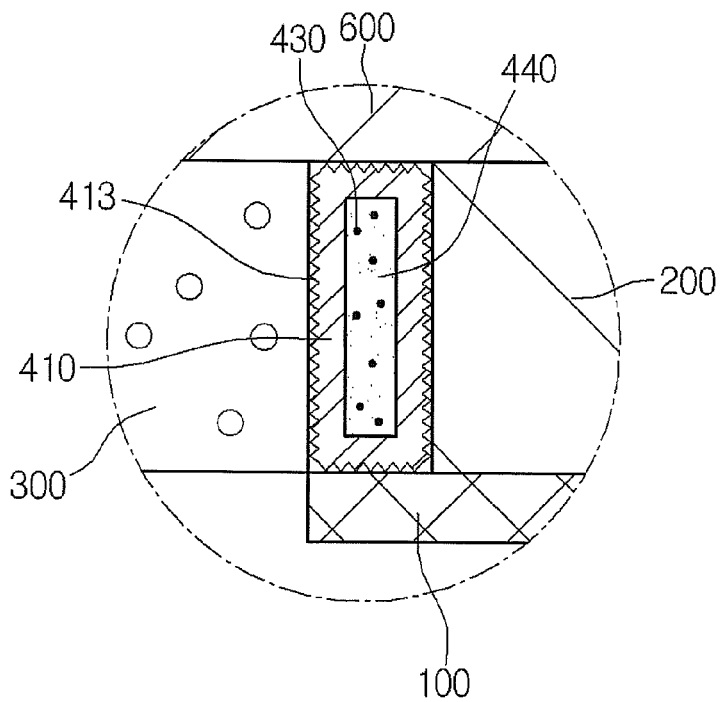
FIG. 6 is a sectional view showing an LCD according to the third embodiment.
Figure 7:
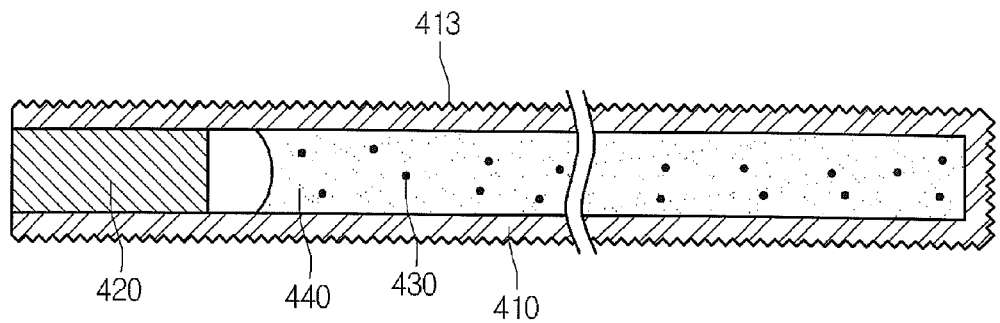
FIG. 7 is a sectional view showing a wavelength conversion member according to the third embodiment.

FIG. 6 is a sectional view showing an LCD according to the third embodiment, and FIG. 7 is a sectional view showing a wavelength conversion member according to the third embodiment. The description of the previous embodiments will be incorporated in the description of the present embodiment by reference and the wavelength conversion member will be further described in the present embodiment. That is, the description about the LCD according to the previous embodiments will be incorporated in the description about the LCD according to the present embodiment.

Referring to FIGS. 6 and 7, the scattering pattern 413 is formed over the whole outer surface of the tube 410. The scattering pattern 413 can be formed through the mechanical process or the chemical etching process.

For instance, the tube 410 is immersed in the etchant, such as HF solution, so that the scattering pattern 413 is formed over the whole outer surface of the tube 410. That is, the whole outer surface of the tube 410 is treated through the chemical etching process, so that the roughness may be increased.

The scattering pattern 413 is formed on both incident surface and exit surface of the wavelength conversion member 400. That is, the scattering pattern 413 is formed on the surface directed toward the light guide plate 200 and the surface directed toward the light emitting diodes 300.

As a result, the LCD according to the present embodiment can improve the brightness and the brightness uniformity.

Figure 8:
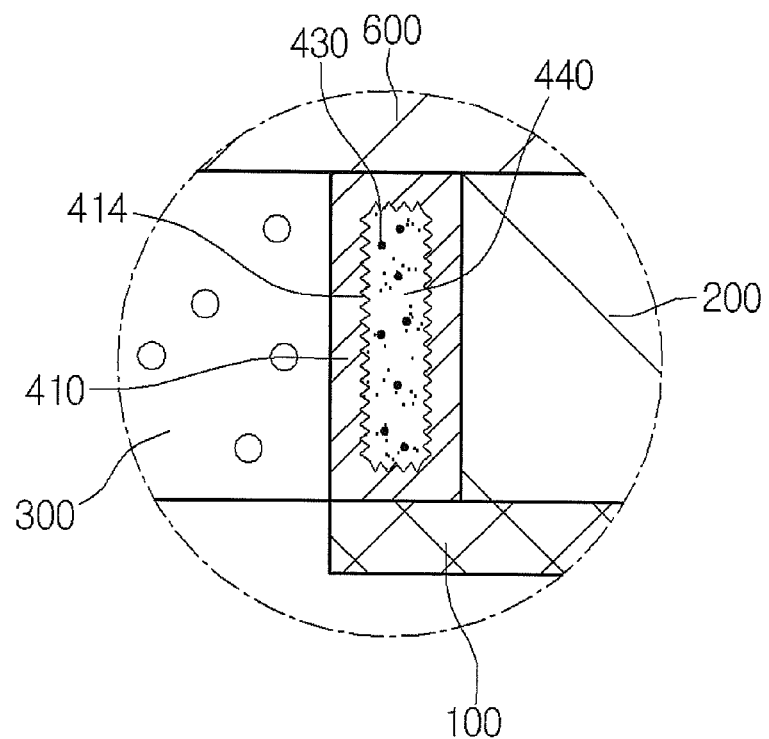
FIG. 8 is a sectional view showing an LCD according to the fourth embodiment.
Figure 9:
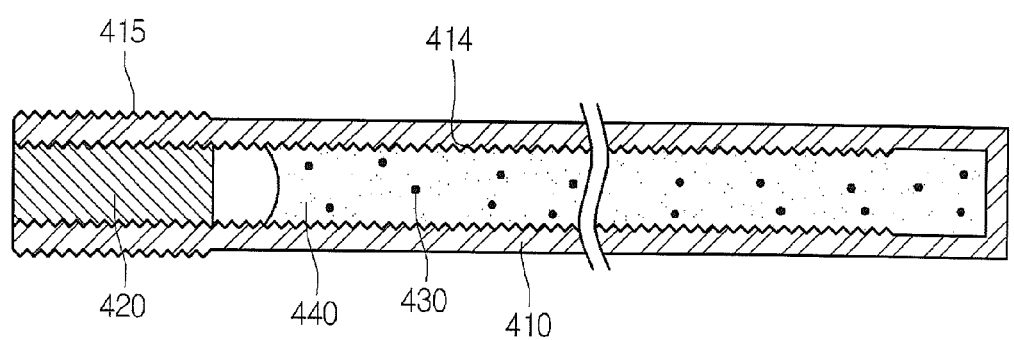
FIG. 9 is a sectional view showing a wavelength conversion member according to the fourth embodiment.
Figure 10:
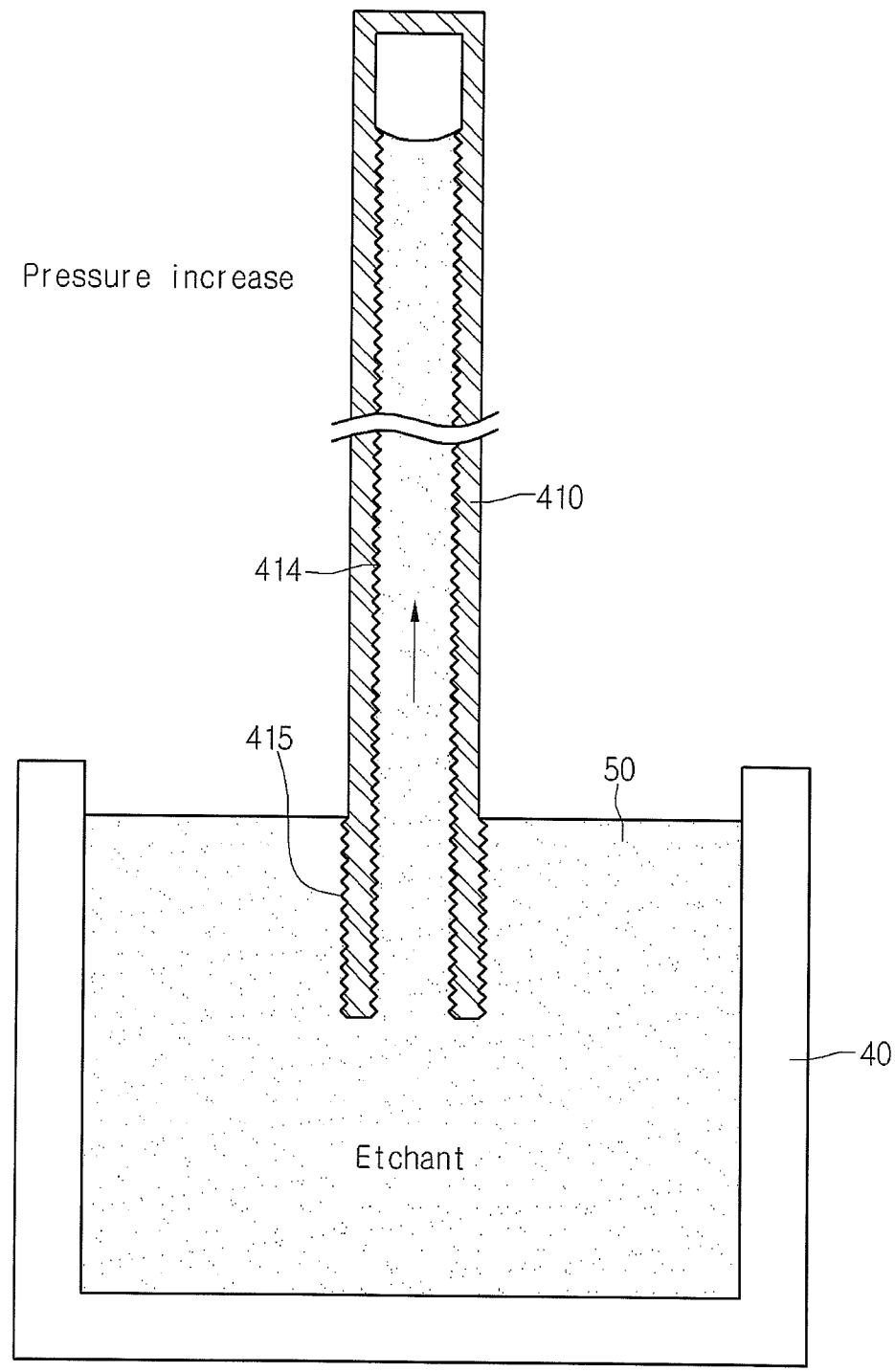
FIGS. 10 and 11 are views showing the procedure for forming a scattering pattern on a tube according to the fourth embodiment.
Figure 11:
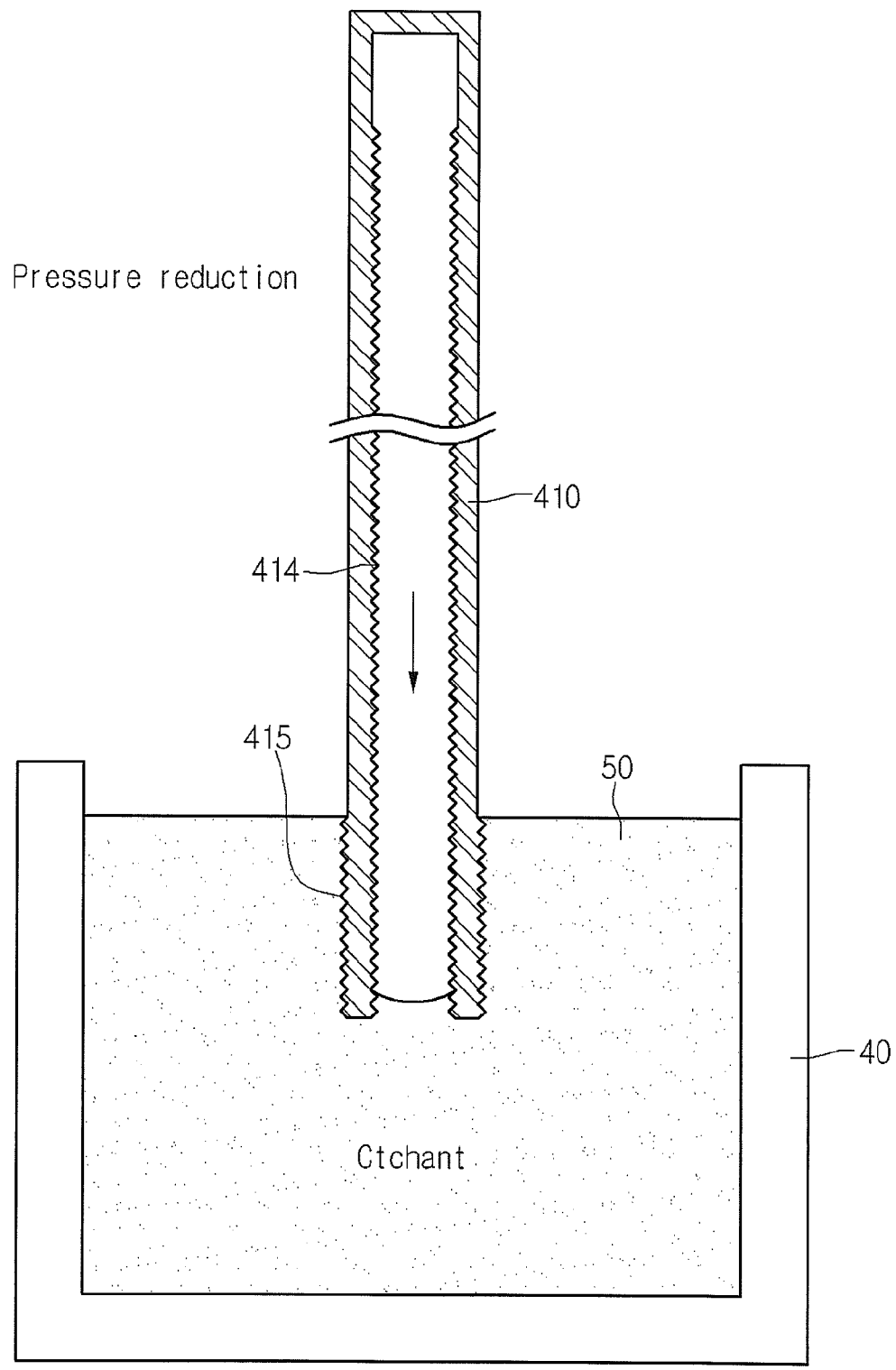

FIG. 8 is a sectional view showing an LCD according to the fourth embodiment, FIG. 9 is a sectional view showing a wavelength conversion member according to the fourth embodiment, and FIGS. 10 and 11 are views showing the procedure for forming a scattering pattern on a tube according to the fourth embodiment. The description of the previous embodiments will be incorporated in the description of the present embodiment by reference and the wavelength conversion member and the method for manufacturing the same will be further described in the present embodiment. That is, the description about the LCD according to the previous embodiment will be incorporated in the description about the LCD according to the present embodiment.

As shown in FIGS. 8 and 9, the scattering pattern 414 is formed on an inner surface of the tube 410. In detail, the scattering pattern 414 is formed over the whole inner surface of the tube 410 except for one end of the tube 410.

In addition, a dummy scattering pattern 415 can be formed on a part of an outer surface of the tube 410. In detail, the dummy scattering pattern 415 is formed on one end of the outer surface of the tube 410. In more detail, the dummy scattering pattern 415 is formed on a region where the wavelength conversion part 420 is formed so that the dummy scattering pattern 415 rarely performs the optical function.

Referring to FIGS. 10 and 11, the scattering pattern 414 can be formed on the tube 410 through the following procedure.

As shown in FIG. 10, in the state that internal pressure of the tube 410 is reduced, an inlet of the tube 410 is immersed in the etchant. Then, external pressure is increased so that the etchant is introduced into the tube 410.

After that, as the external pressure is reduced, the etchant introduced into the tube 410 flows out of the tube 410. The inner surface of the tube 410 is treated by the etchant introduced into the tube 410, so that the scattering pattern 414 is formed.

In the similar way, the inner surface of the tube 410 formed with the scattering pattern 414 can be washed.

The scattering pattern 414 is adjacent to the matrix 440. In detail, the matrix 440 closely adheres to the scattering pattern 414. Due to the scattering pattern 414, the contact area between the matrix 440 and the tube 410 can be enlarged.

In addition, scattering pattern 414 is adjacent to the wavelength conversion part 420. In detail, the wavelength conversion part 420 closely adheres to the scattering pattern 414. Due to the scattering pattern 414, the contact area between the wavelength conversion part 420 and the tube 410 can be enlarged.

Therefore, the wavelength conversion particles 430 can be effectively protected from chemical impact, such as external moisture and oxygen. Thus, the LCD according to the present embodiment may have the improved reliability and durability.

Since the scattering pattern 414 is formed on the inner surface of the tube 410, the LCD according to the present embodiment may improve the brightness and brightness uniformity and may have the improved reliability and durability.

Figure 12:
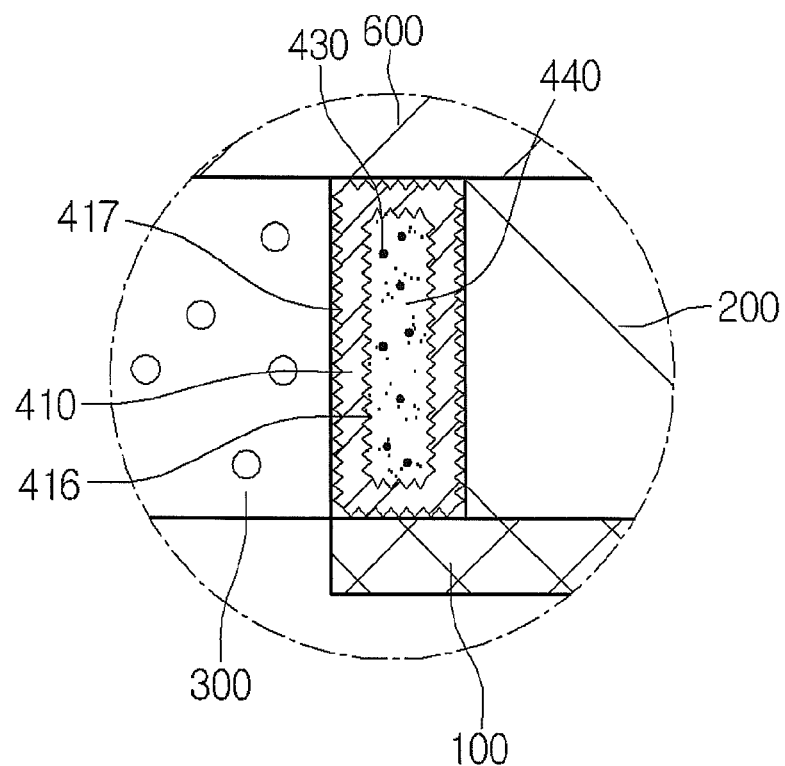
FIG. 12 is a sectional view showing an LCD according to the fifth embodiment.
Figure 13:
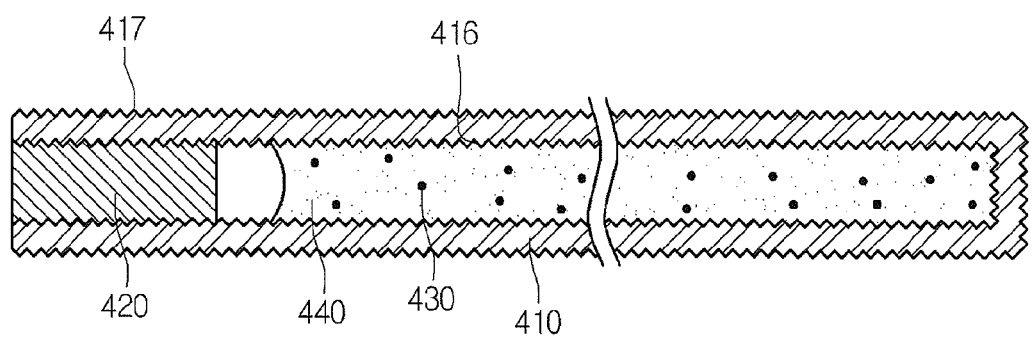
FIG. 13 is a sectional view showing a wavelength conversion member according to the fifth embodiment.
Figure 14:
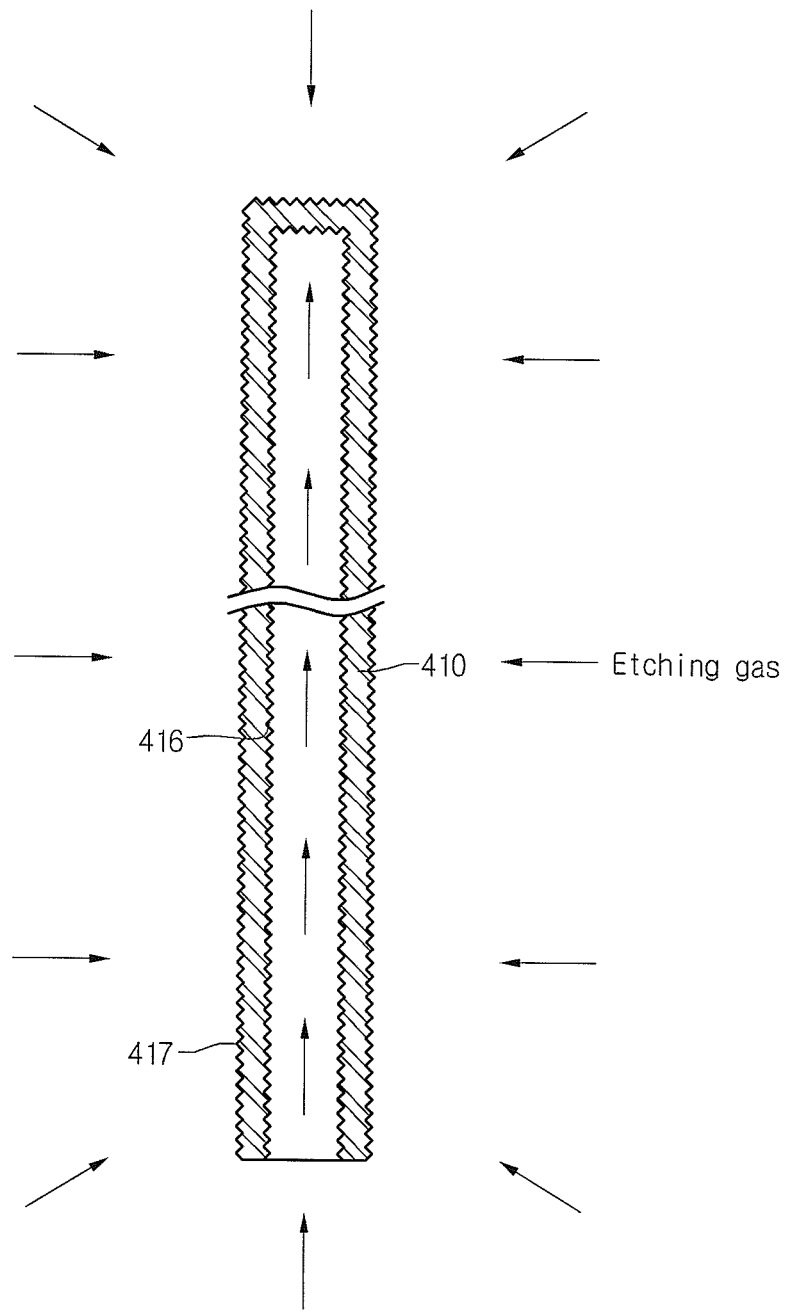
FIG. 14 is a view showing the procedure for forming a scattering pattern on a tube according to the fifth embodiment.

FIG. 12 is a sectional view showing an LCD according to the fifth embodiment, FIG. 13 is a sectional view showing a wavelength conversion member according to the fifth embodiment and FIG. 14 is a view showing the procedure for forming a scattering pattern on a tube according to the fifth embodiment. The description of the previous embodiments will be incorporated in the description of the present embodiment by reference and the wavelength conversion member and the method for manufacturing the same will be further described in the present embodiment. That is, the description about the LCD according to the previous embodiment will be incorporated in the description about the LCD according to the present embodiment.

As shown in FIGS. 12 and 13, scattering patterns 416 and 417 are formed on the whole inner and outer surfaces of the tube 410. That is, the scattering patterns 416 and 417 include the first scattering pattern 416 formed on the inner surface of the tube 410 and the second scattering pattern 417 formed on the outer surface of the tube 410.

A sealing part 420 is installed in the tube 410 while directly making contact with the first scattering pattern 416. That is, since the sealing part 420 directly makes contact with a concavo-convex part, such as the first scattering pattern 416, the tube 410 can be more securely sealed. Therefore, moisture and/or oxygen can be inhibited from penetrating between the tube 410 and the sealing part 420.

Referring to FIG. 14, the scattering patterns 416 and 417 can be formed by etching gas. For instance, the whole surface of the tube 410 is treated under the HF gas atmosphere, so that the scattering patterns 416 and 417 are formed.

The second scattering pattern 417 can be formed by spraying etching gas onto the outer surface of the tube 410. At this time, the etching gas is introduced into the tube 410, so that the first scattering pattern 416 can be formed on the inner surface of the tube 410. Thus, the first scattering pattern 416 is substantially identical to the second scattering pattern 417.

Otherwise, the first scattering pattern 416 can be formed through the method of the fourth embodiment and the second scattering pattern 417 can be formed through the method of the third embodiment.

That is, the first and second scattering patterns 416 and 417 can be formed through different methods. In this case, the first and second scattering patterns 416 and 417 may have properties different from each other.

The first and second scattering patterns 416 and 417 may have heights different from each other according to the optical design. That is, the roughness of the inner surface of the tube 410 may be different from the roughness of the outer surface of the tube 410.

Due to the first and second scattering patterns 416 and 417, the LCD according to the present embodiment may have improved brightness and brightness uniformity. In addition, the LCD according to the present embodiment may have improved reliability and chemical-resistance property.

Further, the wavelength conversion member 400 according to the embodiment may have various optical characteristics by forming the first and second scattering pattern 416 and 417 having different optical characteristics.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The display device according to the embodiments can be used in the display field.

What is claimed is:

1. A display device comprising:
   a light source;
   a plurality of wavelength conversion particles to convert a wavelength of a light generated from the light source; and
   a tube to receive the wavelength conversion particles,
   wherein a scattering pattern is formed on at least one surface of the tube.

2. The display device of claim 1, further comprising a light guide plate that receives the light converted by the wavelength conversion particles, wherein the tube includes a first surface directed toward the light guide plate and the scattering pattern is formed on the first surface of the tube.

3. The display device of claim 1, wherein the tube includes a second surface directed toward the light source, and the scattering pattern is formed on the first surface of the tube.

4. The display device of claim 1, wherein the scattering pattern is formed on an outer surface of the tube.

5. The display device of claim 1, wherein the scattering pattern is formed on an inner surface of the tube.

6. The display device of claim 1, wherein the scattering pattern is formed on both inner and outer surfaces of the tube.

7. The display device of claim 6, wherein the tube includes glass.

8. The display device of claim 6, wherein the scattering pattern includes:
   a first scattering pattern on the inner surface of the tube; and
   a second scattering pattern on the outer surface of the tube,
   wherein the first scattering pattern is different from the second scattering pattern.

9. A display device comprising:
   a light guide plate;
   a display panel on the light guide plate;
   a light source at a lateral side of the light guide plate;
   a tube between the light guide plate and the light source; and
   a plurality of wavelength conversion particles in the tube,
   wherein a scattering pattern is formed on the tube.

10. The display device of claim 9, wherein the scattering pattern is formed on an inner surface of the tube.

11. The display device of claim 9, wherein the scattering pattern is formed on both inner and outer surfaces of the tube.

12. The display device of claim 9, further comprising a sealing part installed in the tube, wherein the sealing part directly makes contact with the scattering pattern.

13. The display device of claim 9, further comprising a matrix installed in the tube while surrounding the wavelength conversion particles, wherein the scattering pattern is disposed between the light guide plate and the matrix.

14. The display device of claim 9, further comprising a matrix installed in the tube while surrounding the wavelength conversion particles, wherein the scattering pattern is disposed between the light source and the matrix.

15. A method for manufacturing an optical member, the method comprising:
 forming a scattering pattern on one surface of a tube; and
 injecting a plurality of wavelength conversion particles into the tube to covert a wavelength of an incident light.

16. The method of claim 15, wherein the forming of the scattering pattern on the tube includes mechanically scratching an outer surface of the tube.

17. The method of claim 15, wherein the forming of the scattering pattern on the tube includes surface-treating an outer surface of the tube by using etching gas or etchant.

18. The method of claim 15, wherein the forming of the scattering pattern on the tube includes injecting etching gas into the tube.

19. The method of claim 15, wherein the forming of the scattering pattern on the tube includes injecting etchant into the tube.

* * * * *